United States Patent [19]
Crofoot

[11] Patent Number: 4,892,467
[45] Date of Patent: Jan. 9, 1990

[54] BALANCED ROLLING ROTOR MOTOR COMPRESSOR

[75] Inventor: James F. Crofoot, Kirkville, N.Y.

[73] Assignee: Carrier Corporation, Syracuse, N.Y.

[21] Appl. No.: 282,528

[22] Filed: Dec. 12, 1988

[51] Int. Cl.[4] .............................................. F04C 23/02
[52] U.S. Cl. ..................... 417/353; 418/151; 310/114; 74/572; 74/573 R
[58] Field of Search .................. 417/353; 418/151; 310/114, 116; 74/572, 573 R

[56] References Cited

U.S. PATENT DOCUMENTS 2,561,890  7/1951  Stoddard .............................. 417/353
4,086,038  4/1978  Lambrecht ........................... 418/151

FOREIGN PATENT DOCUMENTS 0179396  11/1982  Japan ................................... 418/151

Primary Examiner—William L. Freeh
Assistant Examiner—David W. Scheuermann
Attorney, Agent, or Firm—David J. Zobkiw

[57] ABSTRACT

A rolling rotor motor/compressor is provided with counterweights for mechanical balancing while permitting radial movement of the rotor/piston. This permits unloading of the compressor such as when there is a liquid slug. The rotor/piston and the counterweights are driven by diametrically opposed windings so that the rotor/piston does not drive the counterweights with attendant power/capacity reductions.

7 Claims, 7 Drawing Sheets

ON AT OFF

ON BEFORE OFF

BALANCED ROLLING ROTOR MOTOR COMPRESSOR

BACKGROUND OF THE INVENTION

A rolling rotor motor is one in which only a portion of the windings are activated at any given time and the resultant asymmetric magnetic field is moved around the stator by changing which ones of the windings are the activated windings. This type of motor is characterized by high torque and low speed. Where the rotor is located internally of the stator, the coaction between the rotor and stator as a result of the asymmetric magnetic field, unless otherwise limited, is like that of the piston and cylinder of a rolling piston or reciprocating vane type compressor. As a result, the rotor may also be the piston of a rolling piston compressor such as is disclosed in U.S. Pat. No. 2,561,B90. Since the rotor rolls around the stator, there are low bearing loads as compared to a motor in which the rotor is constrained to rotate about a fixed axis.

The rolling rotor motor can be integral with the compressor thereby reducing the size and number of parts such as shafts and bearings, but it has some inherent disadvantages. Because only some of the windings are activated at any particular time, the output torque per pound of motor weight is less than it would be for an induction motor. Also, the rotor is dynamically unbalanced since its center traces a circular orbit as it moves circumferentially towards the activated windings due to magnetic attraction as it follows the rotating field. The unbalance forces increase with the square of the rotor speed thus making the motor unsuitable for high speed applications.

SUMMARY OF THE INVENTION

A short axial shaft is provided on each end of the rolling rotor for mounting a counterweight. The rotor and counterweight are located within the stator bore. The shafts coact with the counterweights, during operation, so that the counterweight masses are always located diametrically opposite the rotor mass relative to the center line of the stator. The drive for each of the counterweights is the second winding of a pair of windings spaced 180° with one winding driving the rotor and the other driving the counterweights. However, the rotor is free to change its radius of operation such as rolling over foreign material on the inside of the stator or a liquid slug when used as a compressor.

It is an object of this invention to dynamically balance a rolling rotor motor/compressor.

It is an additional object of this invention to dynamically balance a rolling rotor motor/compressor and to transmit the torque supplied by the rolling counterweights to the rotor.

It is another object of this invention to provide counterbalance weights which are simple to apply and which do not restrict the action of the rolling rotor.

It is a further object of this invention to permit the rolling rotor to change its radius of operation. These objects, and others as will become apparent hereinafter, are accomplished by the present invention.

Basically, the rotor and counterweights are located within the stator bore. The centers of gravity of the rotor and of the counterweights are on opposite sides of the center line of the stator bore. The windings are energized in pairs with each member of the pair spaced 180° circumferentially from the other member. As a result, the counterweights act as rotors rotating in the same direction and at the same speed as the rotor thus providing dynamic balance. When the counterweights are coupled to the rotor, the torque supplied by the rolling counterweights is transmitted to the rotor thereby increasing the driving force.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
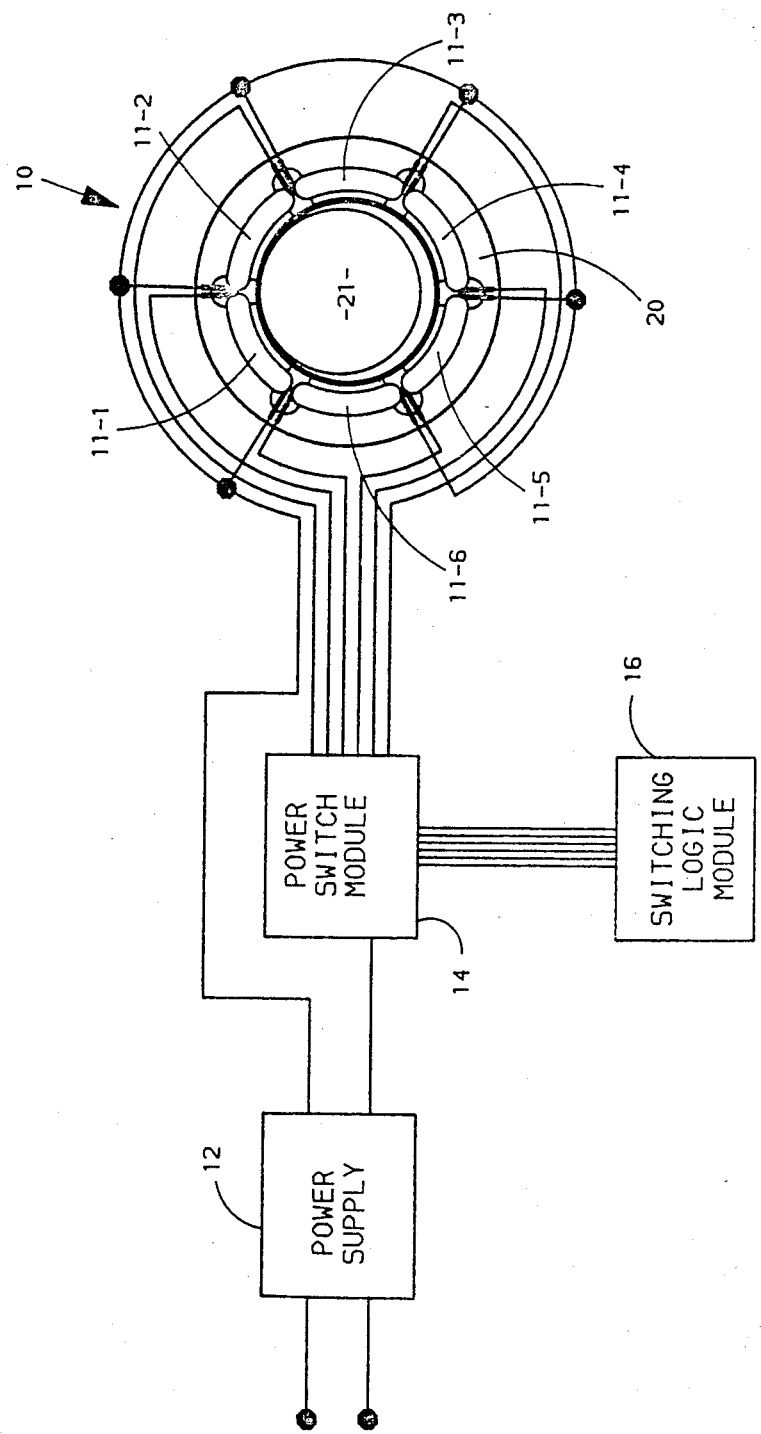
FIG. 1 is a circuit diagram for a rolling rotor motor/compressor.
Figure 2:
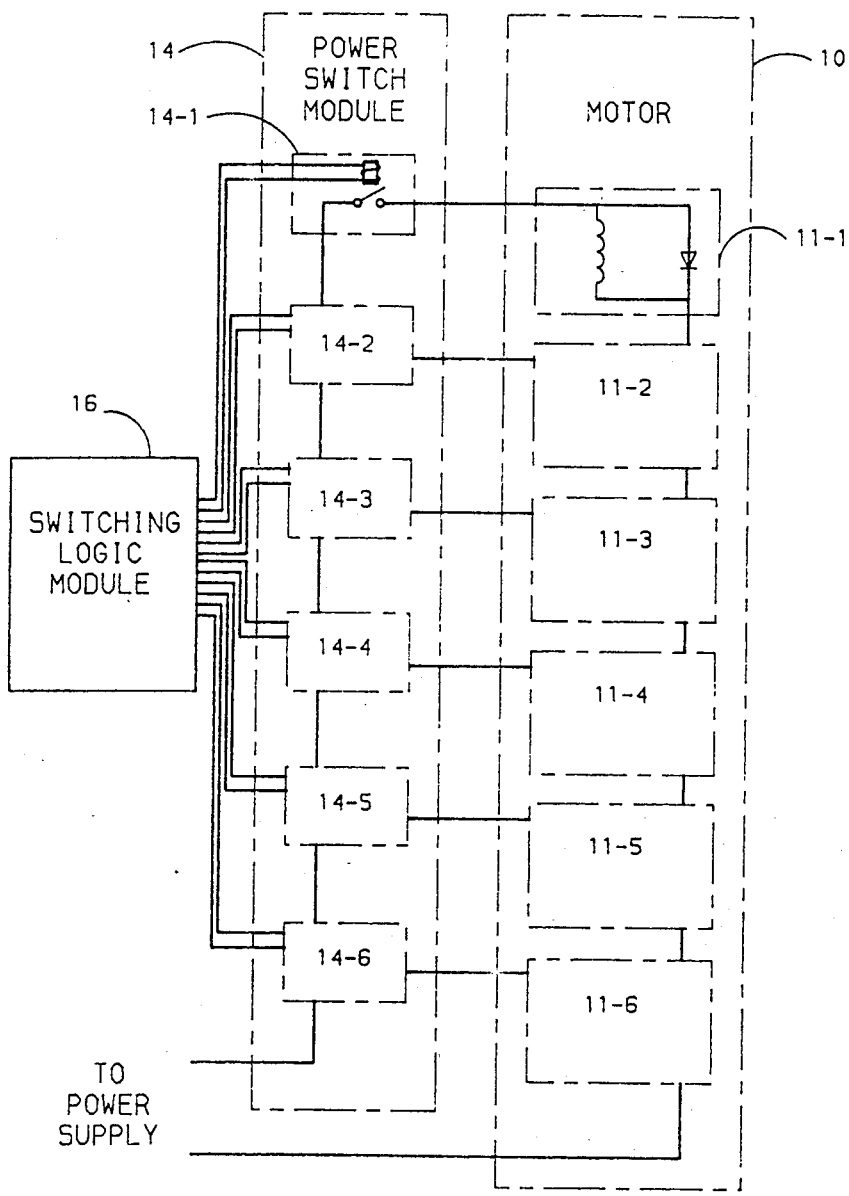
FIG. 2 is a more detailed view of the switching portion of the circuit of FIG. 1.
Figure 3:
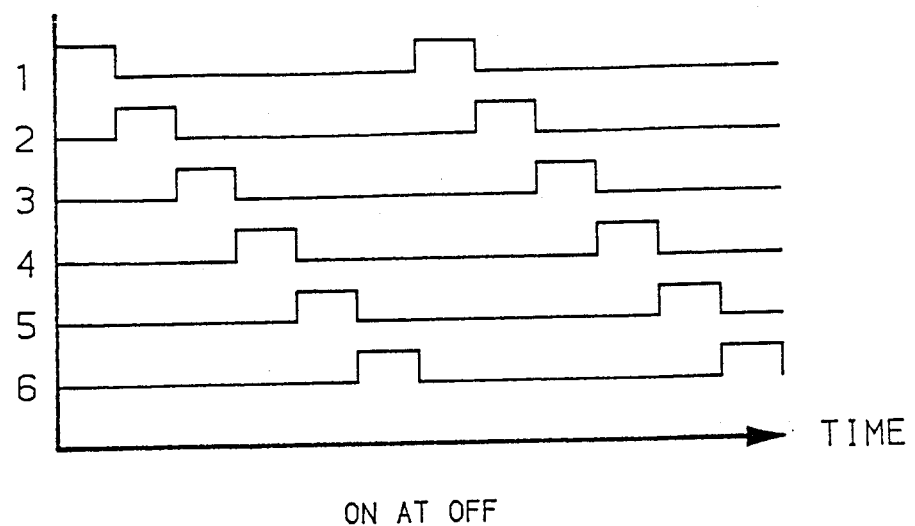
FIG. 3 is a graph showing the actuation of the switches as a function of time in the on at off mode.
Figure 4:
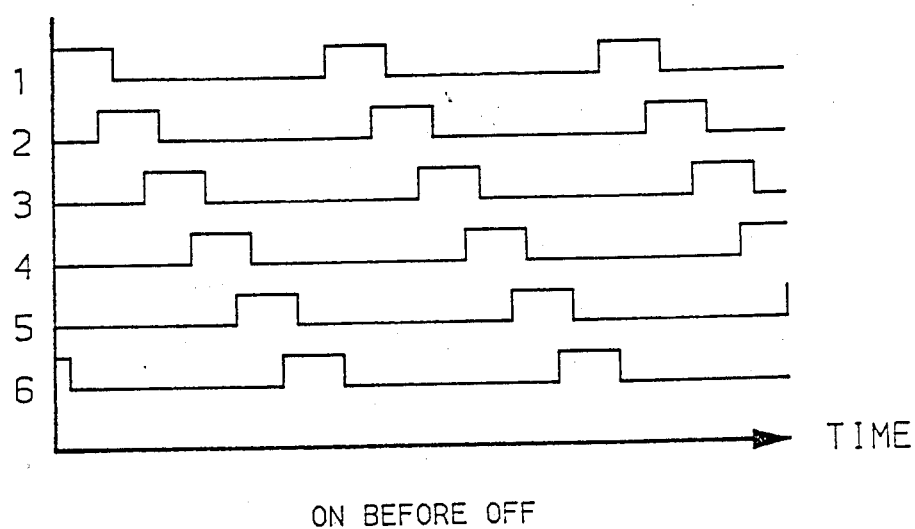
FIG. 4 is a graph showing the actuation of the switches as a function of time in the on before off mode.

In FIG. 1 the numeral 10 generally designates a rolling rotor motor/compressor which has a plurality of windings with six, 11-1 to 6, being illustrated. Power from power supply 12 is supplied to windings 11-1 to 6 by power switch module 14 under the control of switching logic module 16. Referring to FIG. 2, it will be noted that the power supply 12 is connected to windings 11-1 to 6 through switches 14-1 to 6 which are controlled by switching logic module 16. Switch 14-1 is illustrated as solenoid actuated but any suitable power switching may be employed. Switches 14-1 to 6, as illustrated in FIG. 3, can be actuated in an "on at off" mode wherein the shutting off of power to one winding coincides with the supplying of power to the next winding. Alternatively, as illustrated in FIG. 4, switches 14-1 to 6 can be actuated in an "on before off" mode wherein power is supplied to a winding for a short period of time after power is supplied to the next winding.

Figure 5:
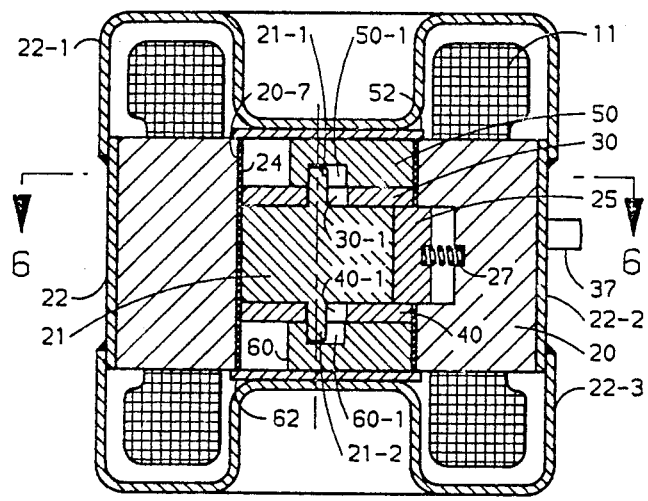
FIG. 5 is a vertical section of a rolling rotor motor/compressor taken along line 5—5 of FIGS. 6 A and B.
Figure 6A:
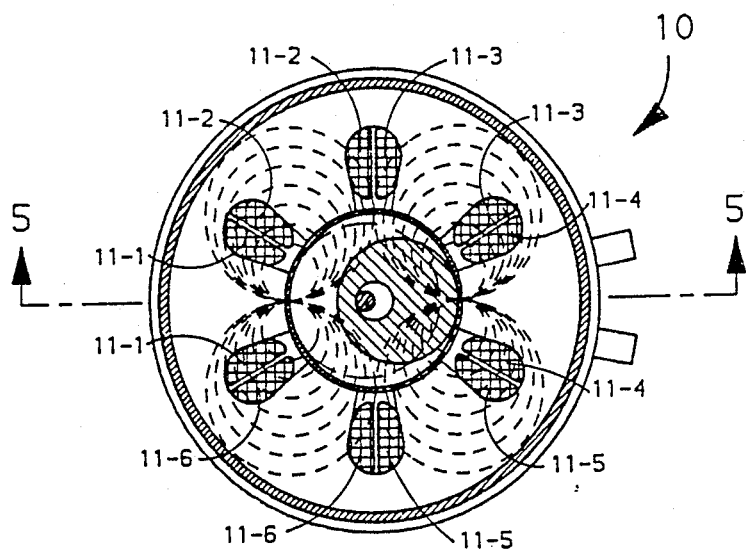
FIGS. 6 A and B are horizontal sections taken along line 6—6 of FIG. 5 and, respectively showing the motor with and without the magnetic field.

In FIGS. 5 and 6 A and B, the numeral 10 generally designates a rolling rotor motor/compressor which includes a stator 20 having poles 20-1 to 6 which are each surrounded by windings 11 made up of individual windings 11-1 to 6 and a rotor/piston 21 having short axial shafts 21-1 and 2. Short shafts 21-1 and 2 are rotatably received in bores 30-1 and 40-1, respectively of sealing plates 30 and 40 and extend into recesses 50-1 and 60-1 of counterweight 50 and 60. Axial shafts 21-1 and 21-2 move about the circumference of bores 30-1 and 40-1, respectively. The coaction between axial shafts 21-1 and 21-2 with recesses 50-1 and 60-1 of counterweights 50 and 60 does not interfere with the radial movement of the rotor 21. The rolling rotor motor/compressor 10 is in hermetic shell 22 made up of top, middle and bottom portions 22-1, 22-2 and 22-3, respectively. Top and bottom portions 22-1 and 22-3 are dished such that the dished portions contact plates 52 and 62, respectively. Plates 52 and 62 are held against stator 20 and provide bearing surfaces for counterweights 50 and 60. Alternatively, plates 52 and 62 can be welded or otherwise suitably secured to top and bottom portions 22-1 and 3 and/or stator 20.

In operation, as the magnetic field moves about the stator 20 through the selective activation of pairs of diametrically located windings, as described above. The rotor/piston 21 tends to follow the magnetic field produced by one of the windings of the pairs of windings and coacts with the stator 20 in the manner of the coaction of the piston and cylinder of a rolling piston compressor. The rotor/piston 21 thus rotates about the coaxial axes of shafts 21-1 and 2. The shafts 21-1 and 2 move in a circle generally defined by bores 30-1 and 40-1, respectively. Similarly, the magnetic field produced by the other winding of the pairs of windings acts on the counterweights 50 and 60 in the same manner as on the rotor/piston 21 so that counterweights 50 and 60 also act as rotors. By selecting the masses of the counterweights 50 and 60 relative to that of the rotor 21 in combination with the relative locations of the centers of gravity of the counterweights 50 and 60 and rotor 21 relative to the axis of the bore 20-7 of the stator 20, the rolling rotor motor/compressor 10 is dynamically balanced. This balancing would just require standard moment of inertia equations. Since the gas loads change with the compression process, there will be unbalance at some time since the counterweights 50 and 60 do not accommodate these changes. However, the initial selection of the counterweight 50 and 60 can chose some stage of the compression stroke at which balance is established. If a liquid slug, for example, was in the trapped volume of the compressor 10, its incompressibility would create an excess pressure. Because bores 30-1 and 40-1 and recesses 50-1 and 60-1 are provided, rotor/piston 21 can move away from the wall of bore 20-7 of stator 20 thereby unsealing the trapped volume and permitting the rotor/piston 21 to override the liquid slug, grit, etc. Preferably bore 20-7 is provided with a liner or suitable coating 24.

For compressor operation, it is necessary to close the ends of the chamber defined between stator 20 and rotor 21. This is achieved by plates 30 and 40 which are sealingly attached to the stator 20 by any suitable means such as welding. Plates 30 and 40 remain stationary and in sealing contact with rotor 21 which rotates due to the changing magnetic field. Refrigerant at suction pressure is supplied from the refrigeration system (nor illustrated) via line 36 and refrigerant at discharge pressure is supplied to the refrigeration system (not illustrated) via line 37 in the conventional manner for a rolling piston compressor.

Figure 6B:
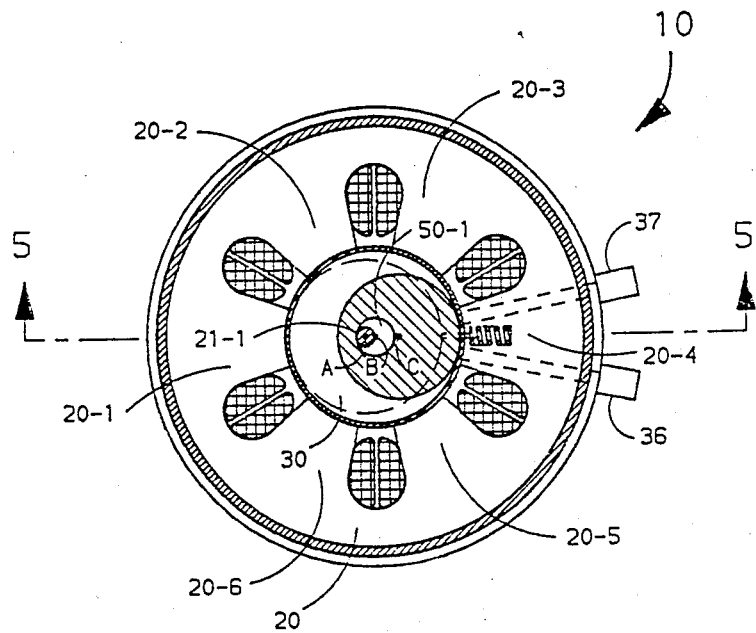
Figure 7:
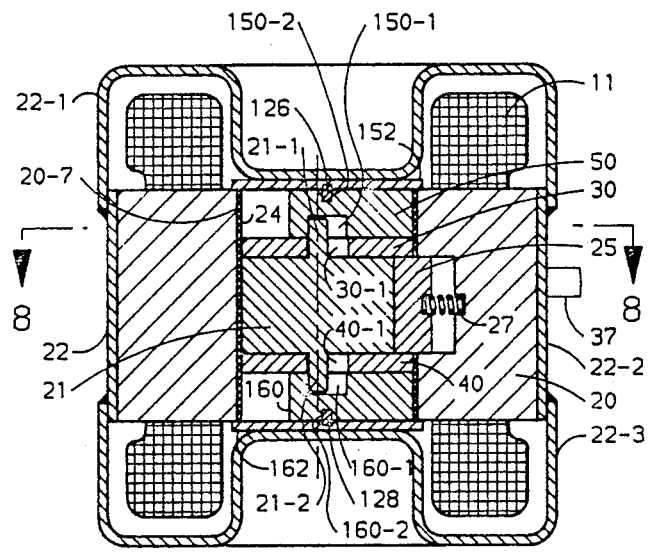
FIG. 7 is a vertical section of a modified rolling rotor motor/compressor taken along line 7—7 of FIGS. 8 A and B.
Figure 8A:
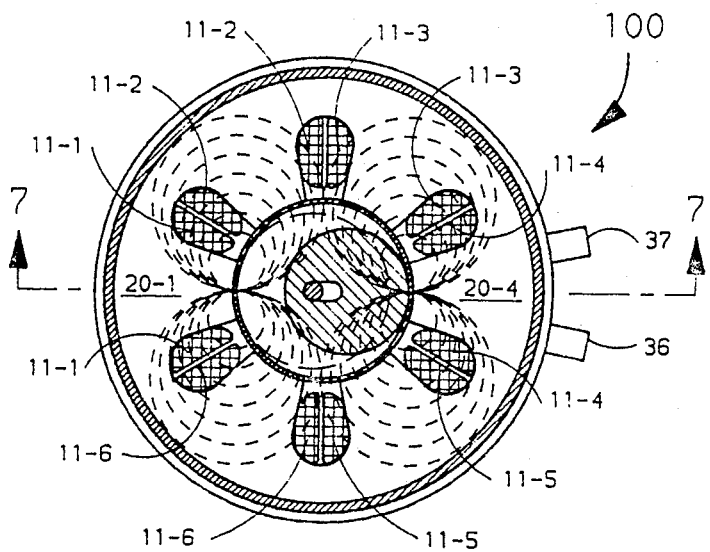
FIGS. 8 A and B are horizontal sections taken along line 8—8 of FIG. 7 and, respectively showing the motor with and without the magnetic field.
Figure 8B:
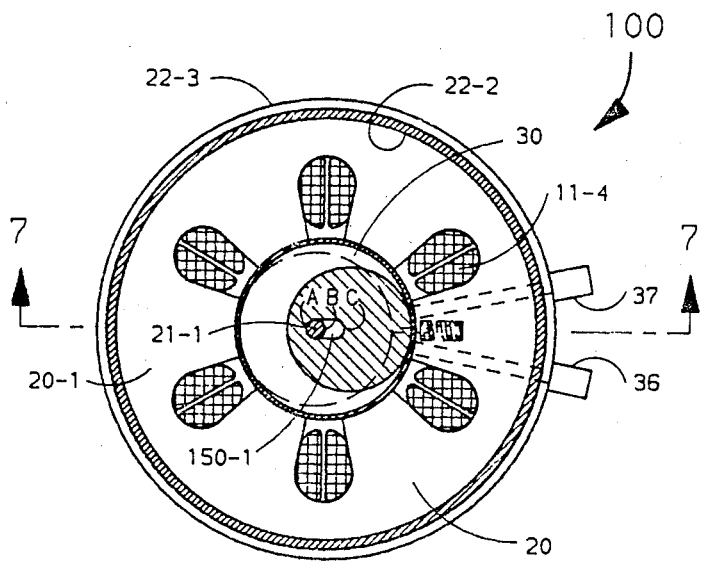

The rolling rotor motor/compressor 100 of FIGS. 7 and 8 A and B is structurally identical to the rolling rotor motor/compressor 10 of FIGS. 1–6 except in the details of counterweights 150 and 160. All structure in FIGS. 7 and 8 A and B that is identical with the corresponding structure in FIGS. 5 and 6 A and B has been labeled the same. All new and modified structure has been labeled one hundred higher than the corresponding structure of FIGS. 1–6. The counterweights 50 and 60 of rolling rotor motor/compressor 10 do not have a fixed axis of rotation whereas counterweights 150 and 160 do. Specifically, counterweights 150 and 160 have bores 150-2 and 160-2 which receive and rotate about axial shafts 126 and 128. Axial shafts 126 and 128 are received in, or are integral with, contact plates 152 and 162 and are coaxial with bore 20-7 of stator 20. Short shafts 21-1 and 2 are received in elongated slots 150-1 and 160-1 which permit radial movement of rotor/piston 21 while counterweights 150 and 160 are prevented from radial movement by the coaction of axial shafts 136 and 128 with bores 150-2 and 160-2, respectively.

Referring now specifically to FIGS. 6 B and 8 B, A represents the projection of the axis of rotor 21. B represents the projection of the axis of bore 20-7 as well as the axis of shafts 126 and 128. C represents the projection of the axes of the centers of counterweights 50, 60, 150 and 160 in their normal operating position relative to axes A and B. In FIGS. 6 A and B and 8 A and B, the rotor/piston 21 is shown in phantom. Also, in FIGS. 6 B and 8 B, vane 25 and spring 27 are shown in phantom.

In operation, the operation of rotor/piston 21 will be considered first. In FIGS. 5–8, the rotor/piston 21 is illustrated in its left most position which is in contact with or in the closest available proximity to pole 20-1 as a result of the actuation of winding 11-1 which surrounds pole 20-1. Liner 24, if present, will keep rotor/piston 21 spaced from pole 20-1. Adjacent windings 11-2 and 11-6 are not activated at that time except in the on before off mode described with respect to FIG. 4. In compressor operation, spring 27 reciprocatably biases vane 25 into contact with rotor/piston 21. As windings 11-2 to 11-6 are sequentially activated, rotor/piston 21 is sequentially moved to being in contact or proximity with poles 20-2 to 6 before winding 11-1 is activated to initiate another cycle. This operation is generally conventional and if compressor operation is taking place, refrigerant or some gas is drawn via line 36 into a chamber defined by rotor/piston 21 and liner 24 in conjunction with vane 25 and plates 30 and 40, is compressed, and is discharged via line 37. Without more, in the case of motor/compressor 10 rotor shafts 21-1 and 2 would be able to freely move in bores 30-1 on 40-1 and recesses 50-1 and 60-1 without requiring the movement of counterweights 50 and 60 and there would be an unbalanced condition. In the case of motor/compressor 100, the coaction of rotor shafts 21-1 and 2 with elongated slots 151 and 152, because of the limitation of movement of counterweights to rotary motion about shafts 126 and 128, causes rotor/piston 21 to drive counterweights 150 and 160. This results in a balanced device but more work is required because the counterweights 150 and 160 are driven through the rotor/piston 21.

Referring now to FIGS. 6 A and 8 A, it will be noted that both windings 11-1 and 11-4 are activated at the same time. Rotor/piston 21 is drawn to pole 20-1 as a result of the actuation of winding 11-1 as was explained above. The simultaneous activation of winding 11-4 draws counterweights 50 and 60, and 150 and 160 to pole 20-4 which also puts shafts 21-1 and 2 at the left most position in recesses 50-1 and 60-1 and 150-1 and 160-1.

For motor/compressor 10, the sequential actuation of diametrically located pairs of windings drives counterweights 50 and 60 in concert with rotor/piston 21 to keep the motor/compressor 10 balanced. If a liquid slug or the like is encountered, rotor/piston 21 would be able to move in opposition to the magnetic and centrifugal forces to unload the compressor through the movement of shafts 21-1 and 2 in recesses 50-1 and 60-1 due to the pressure increase caused by the liquid slug. The movement of rotor/piston 21 away from liner 24 due to a liquid slug or the like, relocates axis A—A and shafts 21-1 and 2 with respect to recesses 50-1 and 60-1 as shown in FIGS. 5 and 6B. This new relationship does not permit the axis C—C of the counterweights 50 and 60 to move to the same side of axis B—B as axis A—A. As a result, the rotor piston 21 and counterweights 50 and 60 are always acted on by diametrically located pole.

For motor/compressor 100, the coaction of rotor/piston 21 and counterweights 150 and 160 is that of a linkage. As in the case of motor/compressor 10, the rotor/piston 21 and the counterweights 150 and 160 are each driven by diametrically opposed windings. As explained above, counterweights 150 and 160 would be driven through rotor/piston 21 if they were not driven through the activation of the opposed windings. As a result, the motor/compressor 100 is balanced and the driving of the counterweights 150 and 160 does not diminish the power available for driving rotor/piston 21. In fact, because of the linkage the power driving the counterweights 150 and 160 can be transferred to the rotor/piston 21 as can the inertial effects of the counterweights 150 and 160. If a liquid slug is encountered, shafts 21-1 and 2 can move radially in recesses 150-1 and 2 to achieve unloading but the linkage remains other than for the momentary movement of axis A towards axis B to achieve the unloading. Because recesses 150-1 and 2 are in the form of a slot and because counterweights 150 and 160 have fixed axes, there is no tendency for the counterweights 150 and 160 to be drawn to the same pole as rotor/piston 21 and vice versa.

Although preferred embodiments of the present invention have been illustrated and described, other changes will occur to those skilled in the art. For example, if there are enough poles, two or more adjacent pairs of diametrically located poles may be activated. It is therefore intended that th scope of the present invention is to be limited only by the scope of the appended claims.

What is claimed is:

1. A rolling rotor motor means comprising:
   housing means;
   stator means within said housing means and having a plurality of windings and a cylindrical opening therein;
   cylindrical rotor means located within said cylindrical opening and defining therewith a chamber;
   said rotor means having a pair of axially extending shafts;
   a pair of counterweight means in said cylindrical opening each coacting with one of said pair of shafts whereby said pair of counterweight means and said rotor means move as a unit responsive to the sequential actuation of said plurality of windings.

2. The rolling rotor motor means of claim 1 wherein each of said counterweight means is rotatably secured to said housing means and has an opening for receiving one of said pair of shafts of said rotor means.

3. The rolling rotor motor means of claim 2 wherein said opening is a slot for permitting radial movement of said rotor means.

4. The rolling rotor motor means of claim 3 further including vane means extending into said chamber whereby said rolling rotor motor means is also a rolling rotor compressor.

5. The rolling rotor motor means of claim 1 further including vane means extending into said chamber whereby said rolling rotor motor means is also a rolling rotor compressor.

6. The rolling rotor motor means of claim 1 wherein each of said counterweight means has an opening for receiving one of said pair of shafts of said rotor means and for permitting radial movement of said rotor means with respect to said counterweight means.

7. The rolling rotor motor means of claim 6 further including vane means extending into said chamber whereby said rolling rotor motor means is also a rolling rotor compressor.

* * * * *